No. 620,282. Patented Feb. 28, 1899.
J. G. COOPER.
CONTROLLING VALVE FOR MOTORS.
(Application filed Nov. 4, 1897.)
(No Model.) 3 Sheets—Sheet 1.

Witnesses:
T. C. Brecht
Jas. W. Graham

Inventor:
James G. Cooper
By Wm C. McIntire
Attorney.

No. 620,282. Patented Feb. 28, 1899.
J. G. COOPER.
CONTROLLING VALVE FOR MOTORS.
(Application filed Nov. 4, 1897.)
(No Model.) 3 Sheets—Sheet 2.

Witnesses:

Inventor:
James G. Cooper

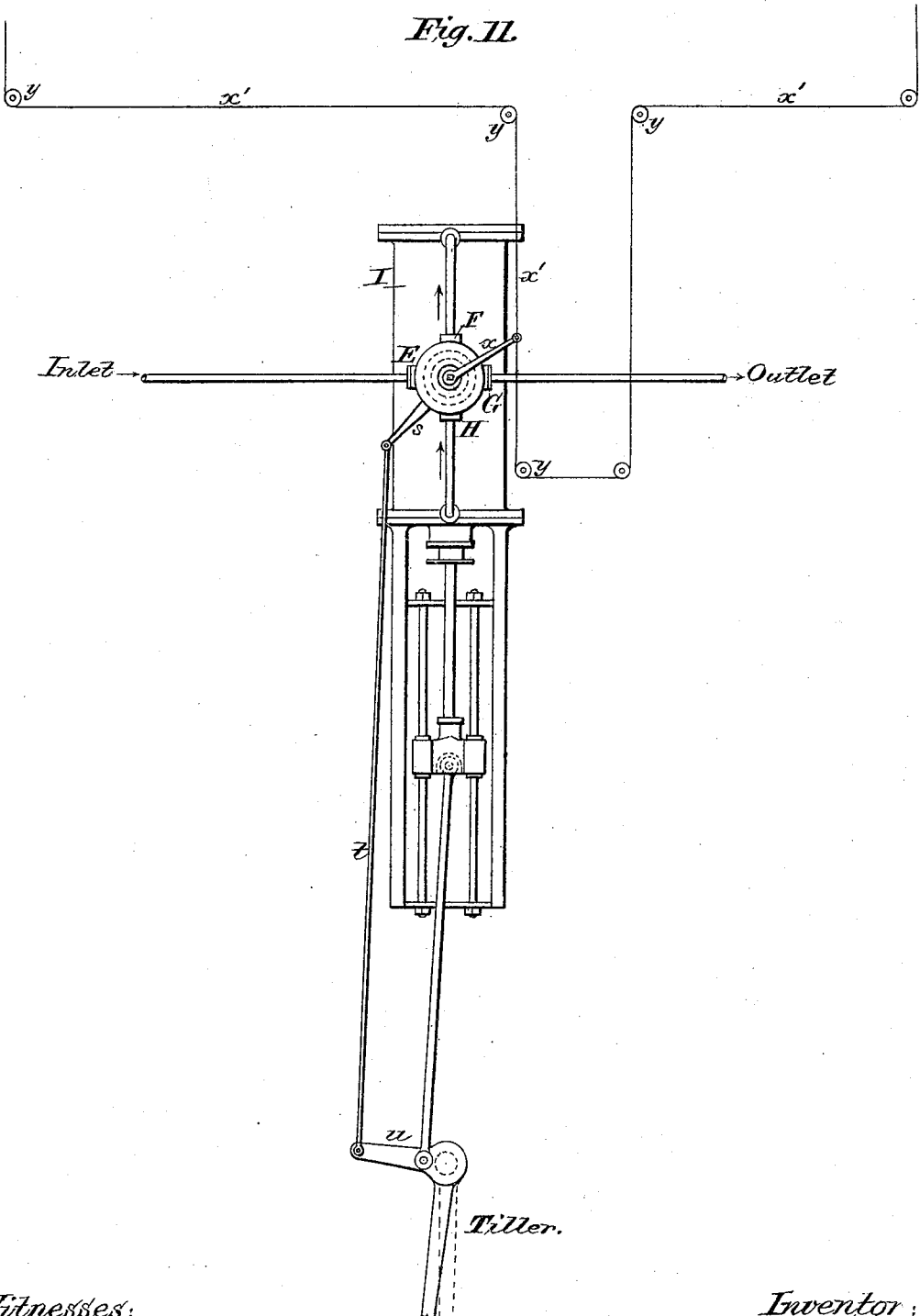

UNITED STATES PATENT OFFICE.

JAMES G. COOPER, OF NEW YORK, N. Y., ASSIGNOR TO CLARENCE LINN AND WILLIAM H. SPEER, JR., OF JERSEY CITY, NEW JERSEY.

CONTROLLING-VALVE FOR MOTORS.

SPECIFICATION forming part of Letters Patent No. 620,282, dated February 28, 1899.

Application filed November 4, 1897. Serial No. 657,395. (No model.)

*To all whom it may concern:*

Be it known that I, JAMES G. COOPER, a citizen of the United States, residing at New York, (Brooklyn,) in the county of Kings and State of New York, have invented certain new and useful Improvements in Controlling-Valves for Motors; and I do hereby declare the following to be a full, clear, and exact description of the invention, such as will enable others skilled in the art to which it appertains to make and use the same.

My invention relates to improvements in the class of valves more particularly employed in the manipulation and control of final moving devices, such as steering apparatus, elevators, and steam, pneumatic, hydraulic, or other apparatus requiring different periods in their action, such as starting, stopping, and intermediate stoppages.

The objects of the invention are to produce a valve which will enable an engine or other motor to be set in motion to the desired extent, checked at intermediate points, and held in such checked position, and also to be readily reversed.

With these ends in view my invention consists in the novel construction of details and the arrangement of parts, as hereinafter more fully described, and specifically pointed out in the claims, reference being had to the accompanying drawings, in which—

Figure 1:
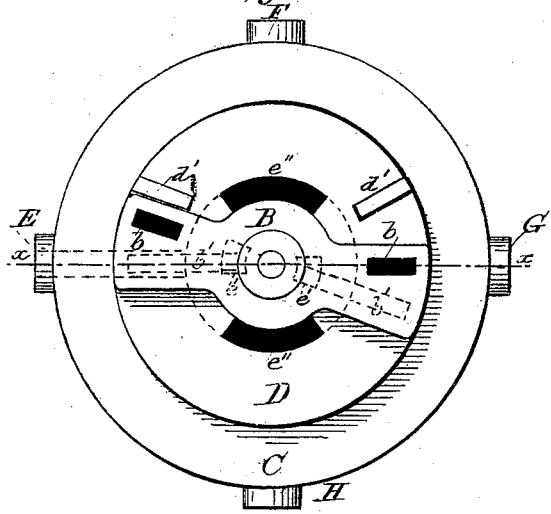
Figure 5:
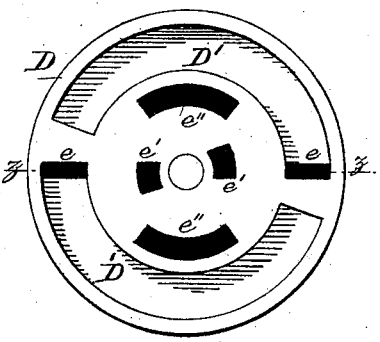
Figure 2:
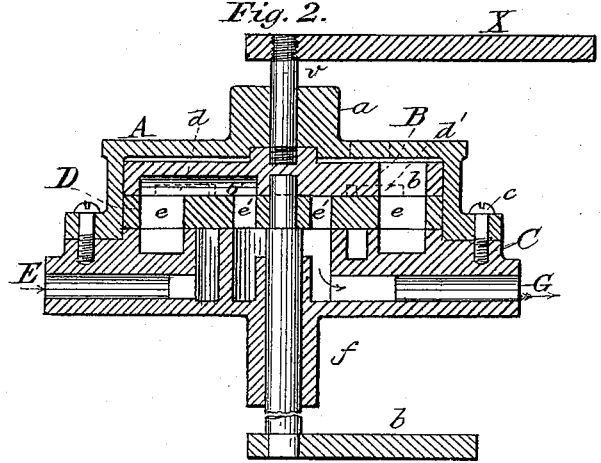
Figure 6:
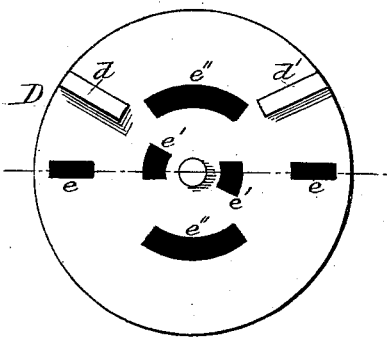
Figure 3:
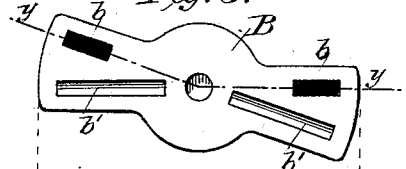
Figure 4:
Figure 7:
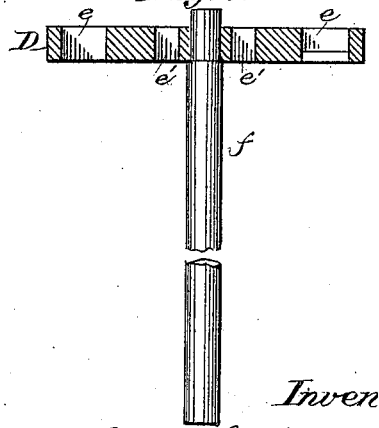
Figure 8:
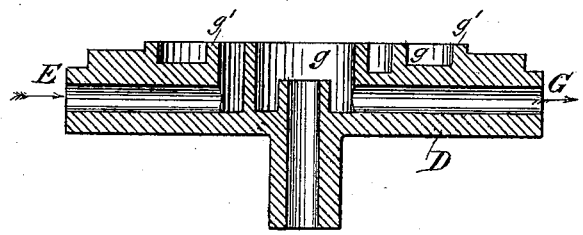
Figure 9:
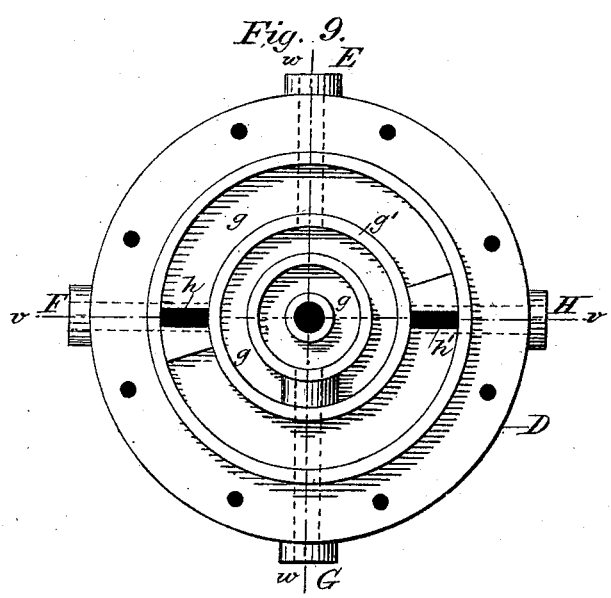
Figure 10:
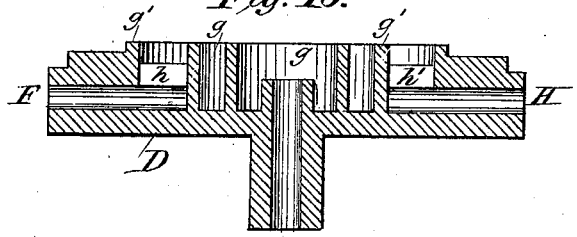

Figure 1 is a top or plan view of the valve with the valve-casing removed. Fig. 2 is a vertical section on line $x\,x$ of Fig. 1 with the casing. Fig. 3 is a bottom view of the cut-off valve. Fig. 4 is a vertical section on line $y\,y$ of Fig. 3. Fig. 5 is a bottom view of the main valve. Fig. 6 is a top or plan view of Fig. 5. Fig. 7 is a vertical section on line $z\,z$ of Fig. 5. Fig. 8 is a vertical section of the valve-seat on line $w\,w$. Fig. 9 is a top or plan view of Fig. 8. Fig. 10 is a vertical section of said valve-seat at right angles to Fig. 8 on line $v\,v$. Fig. 11 is a plan view of the arrangement of the valve and cylinder connected for operation.

For the sake of convenience I have shown in the drawings the valve mechanism disconnected from any device or apparatus which it is designed to control and have shown only a means of connection between the valve and any movable device designed to be controlled by it, as will be fully explained hereinafter.

In the drawings, A represents the valve-casing, having a central hub $a$ for receiving the valve-stem $v$ of the segmental cut-off valve B. This valve-casing is secured to a cylinder containing a piston and rod extending, preferably, through both heads and connected by chains or the like to a tiller of a steering apparatus, elevator, or any equivalent apparatus to be controlled at will by the engineer or other operator. To the stem $v$ is secured a handle or lever X, connected to any suitable operating mechanism. (Not shown.) The flange of the casing is bolted to the valve-seat C by bolts or screws $c$. The cut-off is provided with the ports $b$ and $b'$, the latter of which are oblong, round, elliptical, square, or of semicircular form, while the former extend through the valve. On the back of this valve B is a hub that enters a recess in the valve-casing and serves to steady the movement of the said valve. The cut-off valve is seated on the back of the main or central disk valve D, and suitable stops $d$ limit the movement of the cut-off with that of the main valve. The main valve is provided with the ports $e$, $e'$, and $e^2$, the latter being segmental or semicircular in form. In the main valve the recesses D' D' are for the purpose of keeping the ports $e\,e$ in register with the engine-ports in any position the valve may be placed, as best seen in Fig. 5, and forming a rim, so as to make a continuous seat or face. The stem $f$ of this valve is secured to and extends through it and the valve-seat, and to said stem a suitable lever $b$ and operating mechanism are attached, having motion coincident with the piston, and through any suitable connecting mechanism the movements of the piston are transmitted to a ship's steering-gear or any other last mover.

The valve-seat is provided with the annular depressions $g$, forming the rim $g'$, and it has the ports $h\,h'$ in it. Into the first annular space the horizontal inlet-port E extends, and after passing through the said port and space the steam, air, or other equivalent being admitted through the port E passes into the middle space through the port *e* in the main valve D, and as the cut-off is oscillated said steam or equivalent then passes through the port *b'* in said cut-off and thence through the port *h'* in the valve-seat into the horizontal port F and a suitable pipe to the piston in the cylinder to exert its force. The exhaust then passes into the port H through the ports *h'* and *e'*, extending to the inner annular space, and out through the port G to the condenser or other desired place of destination. It will be readily understood that by admitting the steam through the port H and successively through the spaces and ports, as described in the first place, the valve can be readily reversed in its action and operation.

My improved mechanism is designed especially for use in conjunction with engines for steering vessels, although it is readily adaptable for the operation of elevators, car-brakes, hoisting machinery, or cranes, or any kind of machinery in which it is desired to set in motion the engine or operating-motor, hold it in a certain position, and to easily and quickly reverse the motion, and the modifications required in practice would readily suggest themselves to any skilled mechanic. The last mover may thus be controlled with absolute accuracy.

The steam or other motive power may be admitted through the bottom seat or through the side or top of the casing.

The operation is as follows: The steam or other motive power enters the port E, passing to the outer annular space *g* in the valve-seat through one of the ports *e''* in the main valve into the steam-chest. It then descends through the port *b* in the cut-off, passes into the space *g''*, and thence through the port *h* into the port F, communicating with one end of the cylinder. The exhaust-steam enters through the port G, passing through the ports *e*, the longitudinal port *b'* in the cut-off, thence through the port *e'* into the inner annular space *g'*, and out through the port H to the condenser or the atmosphere. The action of the engine is easily reversed, as will be readily apparent. The arm or lever *x*, Fig. 11, is connected by wire rope, chain *x'*, or its equivalent passing over suitable sheaves or pulleys *y*, arranged as desired, to the steering-wheel of a vessel, the lever of an elevator, hoisting-machine, &c. The arm *s* is connected by a rod *t* to the crank *u* on the tiller, which is also connected to the cross-head of the engine by a pitman *v* and is then controlled by said engine. It will be thus seen that the rudder, elevator, or its equivalent is under the complete control of the operator.

Having thus described my invention, what I claim, and desire to secure by Letters Patent, is—

1. In combination with a valve-seat C and casing A with inlet E, the main valve D having ports as described, stops *d*, *d'*, and stem *f*, with the segmental cut-off B, provided with the ports *b*, *b*, and longitudinal ports *b'*, *b'*, all substantially as specified.

2. In combination with a casing A and a valve-seat C having inlet-openings E, F, and outlet-openings G, H, and the ports *h*, *h'*, with the main valve D, provided with rectangular ports *e* and segmental ports *e'*, and $e^2$, and a segmental cut-off valve B, having the through-ports *b'* and the oblong semicircular ports $b^2$, and stops *d*, *d'* all substantially as set forth.

3. In combination with a casing A secured to a valve-seat C, having the inlet and outlet openings and ports arranged as described, with a main valve D provided with the ports *e*, *e'*, $e^2$ and stops *d*, with the cut-off valve B having the ports *b'* and oblong ports $b^2$, all arranged substantially as specified.

4. In combination with a seat C, valve-casing A and contained disks D, B, arranged as described, the handle X and power-transmitting device *b* or its equivalent, and stops *d*, *d'* substantially as and for the purpose set forth.

5. In combination with a seat C, valve-casing A and a controlling-valve B, with a central disk valve, having suitable ports and actuating a power-transmitting device *b*, and stops *d*, *d'* substantially as specified.

6. The combination of a seat, a valve-casing, having side inlet and outlet or their equivalent, a disk valve provided with stops on its back, with a cut-off valve arranged on the back of said disk valve, an actuating device and a transmitting device to the motor, substantially as specified.

7. In rotary valves, a valve-casing having an inlet for steam or the like and an outlet, with a seat with ports, a central disk valve and a cut-off seated on the back of said disk, provided with stops and operating mechanism, as set forth.

In testimony whereof I affix my signature in presence of two witnesses.

JAMES G. COOPER.

Witnesses:
 WILLIAM H. SPEER, Jr.,
 JNO. LINN.